United States Patent [19]
Richardson et al.

[11] Patent Number: 5,999,896
[45] Date of Patent: Dec. 7, 1999

[54] METHOD AND SYSTEM FOR IDENTIFYING AND RESOLVING COMMONLY CONFUSED WORDS IN A NATURAL LANGUAGE PARSER

[75] Inventors: Stephen Darrow Richardson, Redmond; George E. Heidorn, Bellevue, both of Wash.

[73] Assignee: Microsoft Corporation, Redmond, Wash.

[21] Appl. No.: 08/671,203

[22] Filed: Jun. 25, 1996

[51] Int. Cl.$^6$ .................................................. G06F 17/38
[52] U.S. Cl. ............................................. 704/9; 707/530
[58] Field of Search .............. 704/1, 9–10; 707/530–533

[56] References Cited

U.S. PATENT DOCUMENTS

| | | | |
|---|---|---|---|
| 4,868,750 | 9/1989 | Kucera et al. | 704/9 |
| 4,887,212 | 12/1989 | Zamora et al. | 704/9 |
| 5,060,154 | 10/1991 | Duncan, IV | 704/1 |
| 5,146,405 | 9/1992 | Church | 704/9 |
| 5,146,406 | 9/1992 | Jensen | 364/419 |
| 5,475,558 | 12/1995 | Schabes et al. | 704/8 |
| 5,537,317 | 7/1996 | Schabes et al. | 704/8 |
| 5,721,938 | 2/1998 | Stuckey | 395/754 |

OTHER PUBLICATIONS

Ravin, Yael, "Grammar Errors and Style Weaknesses in a Text–Critiquing System", Natural Language Processing: The PLNLP Approach, 1993, pp. 65–76.

WordPerfect Corporation, WordPerfect Main Street, Grammat–ik, Grammar and Style Checker, Version 6.0, 1994, Table of Contents, Index and pp. 1–34.

IBM ProcessMaster VM Edition, Critique Guide, Publishing Systems, (First Edition), Jun. 1989, Table of Contents and pp. 1–3, 5–67, 69–72 and Comment Form.

Waibel, Alex, Kai–Fu Lee, *Readings in Speech Recognition*, Morgan Kaufmann Publishers, Inc., San Mateo, California, 1990, pp. 450–507.

Bellegarda, Braden–Harder, Jensen, Kanevsky, Zadrozny, "Post–Recognize Language Processing: Applications for Automatic Speech and Handwriting Recognition," *Signal Processing IV: Theories and Applications*, pp. 383–386, 1992.

*Primary Examiner*—Forester W. Isen
*Assistant Examiner*—Patrick N. Edouard

[57] ABSTRACT

A method and system for identifying and resolving commonly confused words in a natural language parser is provided. In a preferred embodiment, a computer system parses input text made up of two or more words using a relation that maps from potentially confused words, including one word among the words of the input text, to possibly intended words. The computer system first identifies the possible parts of speech for each word of the input text including the potentially confused word. The computer system then identifies the possible parts of speech for the possibly intended word to which the relation maps the potentially confused word. Finally, the computer system applies syntactic grammar rules to the identified parts of speech such that a complete syntax tree containing a possible part of speech for the possibly intended word is produced and no complete syntax tree containing a possible part of speech for the potentially confused word is produced. According to a further embodiment of the invention, the computer system provides feedback on the input text by outputting an indication that a sentence in the input text is syntactically incorrect and outputting a further indication that the sentence in the input text would be syntactically correct if the potentially confused word in the input text was replaced with the possibly intended word.

20 Claims, 14 Drawing Sheets confusable word table — 400

| potentially confused word | possibly intended words |
|---|---|
| ad | add |
| add | ad |
| cant | can't |
| elicit | illicit |
| hostel | hostile |
| illicit | elicit |
| principal | principle |
| principle | principal |
| their | there, they're |
| there | their, they're |
| they're | their, there |

& # x 2 0 ; # METHOD AND SYSTEM FOR IDENTIFYING AND RESOLVING COMMONLY CONFUSED WORDS IN A NATURAL LANGUAGE PARSER

TECHNICAL FIELD

The invention relates generally to the field of natural language parsing, and, more specifically, to the field of correcting errors occurring in natural language text.

BACKGROUND OF THE INVENTION

In authoring text, writers occasionally incorrectly use one word where another would be correct. For instance, a writer might author the following sentence, using the word "add" where "ad" would be correct:

The add convinced people.

Word pairs like "add" and "ad" that are consistently mistaken for one another are said to be commonly confused. Commonly confused words often have similar pronunciations (e.g., "advise" vs. "advice") or differ by the transposition of a few letters (e.g., "from" vs. "form"). In the above example, the word "ad" is said to be the "intended word," i.e., the word intended by the author, while the word "add" is said to be the "confused word," i.e., the word that the author has mistakenly substituted for the intended word.

When a sentence contains a confused word, natural language parsers have difficulty parsing the sentence. A natural language parser analyzes sentences of a natural language to discern the lexical and syntactic content of the sentences. For example, a chart-based natural language parser retrieves a dictionary entry from a dictionary for each word in the input sentence. The dictionary entry contains a lexical record containing general information about the word and referencing part-of-speech records that each contain information specific to a particular part of speech that the word may represent. The parser places one or more of the part-of-speech records into a working area called chart, where they are subjected to parsing rules that combine part-of-speech records into larger syntactic units, and ultimately a sentence.

When a natural language parser is used to parse a sentence containing a confused word that does not have the part of speech intended by the author for the intended word, the natural language parser is unable to produce a complete parse of the sentence. Because the purpose of natural language parsers is to produce complete parses accurately representing the intended lexical and syntactic content of input sentences, a natural language parser that is able to produce a complete parse of a sentence containing a confused word is desirable.

SUMMARY OF THE INVENTION

The present invention provides a natural language parser that identifies and resolves commonly confused words during the parsing of an input text segment, such as a sentence. The ability to identify and resolve commonly confused words is of particular value in the context of a grammar checker, which may be used in conjunction with a word processor to assess the grammatical correctness of sentences contained in a document prepared by the writer. Those skilled in the art will recognize, however, that the invention may be gainfully utilized in any application of natural language parsers.

The invention utilizes a list of sets of commonly confused words. Each set contains two or more words that are commonly confused. According to the invention, the parser is adapted to treat words encountered in input sentences that appear in one of the sets as if they can represent parts of speech that may be represented by the other words in the set.

For example, if the words "add" and "ad" comprise a set of confusable words and the word "add" appears in an input sentence, the parse treats the word "add" as if it can represent either a verb or a noun, since the word "add" may represent a verb and the word "ad" may represent a noun. This involves adding to the chart part-of-speech records from the dictionary entries of the other words in the set for which there is no corresponding part of speech in the dictionary entry of the encountered word, or for which the same part of speech has a different number or tense. These additional part-of-speech records are generally added late in the parsing process, after the parser has had an opportunity to apply rules to the original part-of-speech records. Embodiments of the present invention further provide a user interface for a grammar checker to display the results of identifying and resolving a commonly confused word. In certain embodiments, the invention also adds references to these added part-of-speech records to the lexical record for the encountered word, so that rules that use the lexical record for the word to determine what other parts of speech the word may represent consider the possibility that the encountered word may represent these additional parts of speech.

BRIEF DESCRIPTION OF THE DRAWINGS

FIG. 4 is a table diagram showing a sample confusable word table used to identify potentially confused words in the input text.

DETAILED DESCRIPTION OF THE INVENTION

A method and system for identifying and resolving commonly confused words in a natural language parser is provided. In a preferred embodiment, the invention utilizes a list of sets of commonly confused words which may be modified by the user. According to the invention, the parser is adapted to treat words encountered in input sentences that appear in one of the sets as if they can also represent parts of speech that may be represented by the other words in the set. For example, if the words "add" and "ad" comprise a set of confusable words and the word "add" appears in an input sentence, the parse treats the word "add" as if it can represent either a verb or a noun, since the word "add" may represent a verb and the word "ad" may represent a noun. This involves adding to the chart part-of-speech records from the dictionary entries of the other words in the set for which there is no corresponding part of speech in the encountered word. These additional part-of-speech records are generally added late in the parsing process, after the parser has had an opportunity to apply rules to the original part-of-speech records. In certain embodiments, the invention also adds references to these added part-of-speech records to the lexical record for the encountered word, so that rules that use the lexical record for the word to determine what other parts of speech the word may represent consider the possibility that the encountered word may represent these additional parts of speech.

Figure 1:
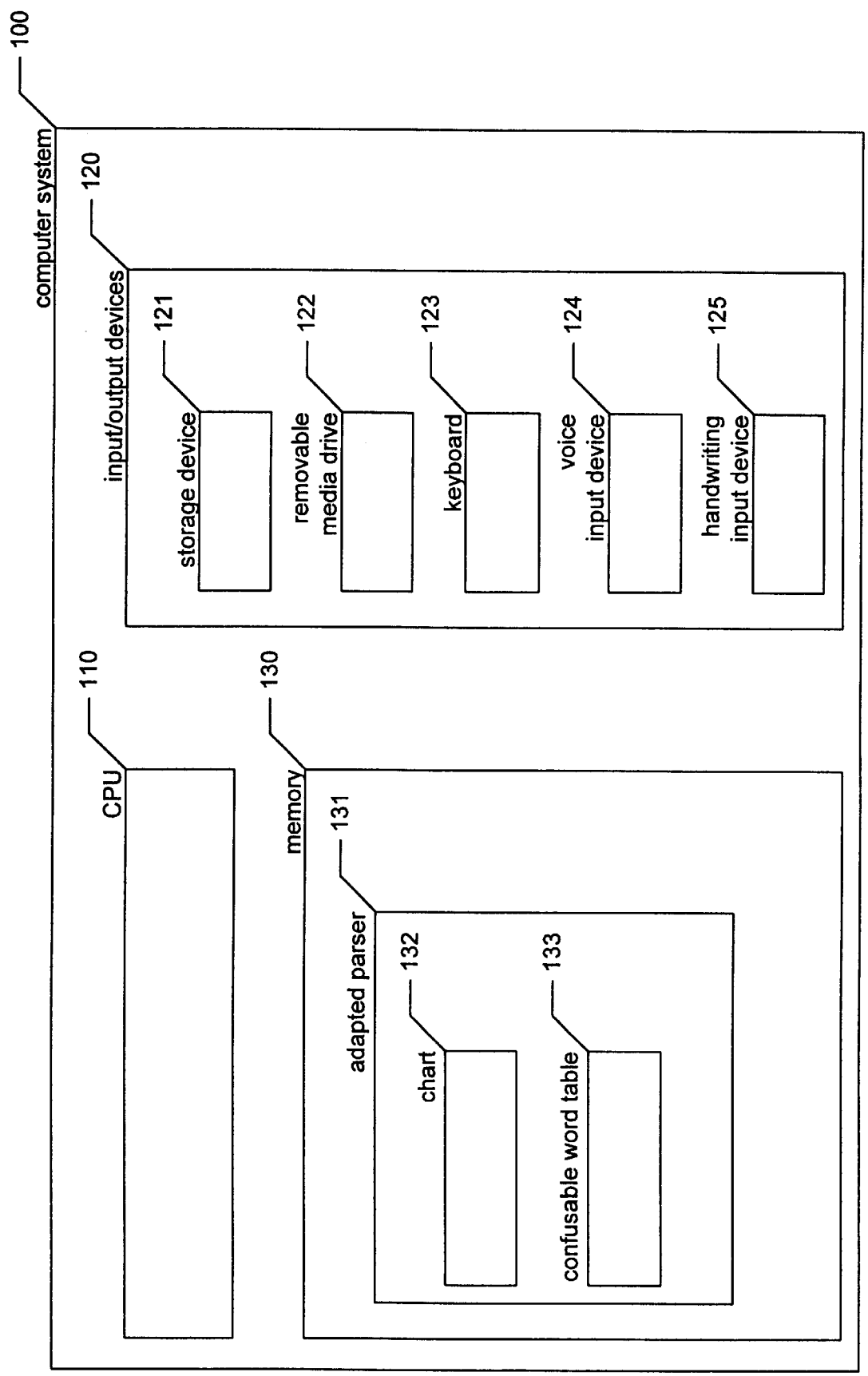
FIG. 1 is a high-level block diagram of the general-purpose computer system upon which the facility preferably operates.

FIG. 1 is a high-level block diagram of the general-purpose computer system upon which the parser preferably operates. The computer system 100 contains a central processing unit (CPU) 110, input/output devices 120, and a computer memory (memory) 130. Among the input/output devices is a storage device 121, such as a hard disk drive. The input/output devices also include a removable media drive 122, which can be used to install software products, including the adapted parser, which are provided on a computer-readable medium, such as a CD-ROM. The input/output devices further include a keyboard 123, which a user may use to directly input natural language text. The input/output devices also optionally include a voice input device 124 and a handwriting input device 125 that the user may use to indirectly input natural language text. Any natural language text inputted by the user using the voice input device is preferably converted from voice data by a voice recognizer (not shown). Similarly, any natural language text inputted by the user using the handwriting input device is preferably converted from handwriting data using a handwriting recognizer (not shown). The memory 130 contains a parser 131 adapted to identify and resolve commonly confused words. The parser includes a chart 132 for containing a parse tree representing an input text segment and intermediate parsing results. The parser also includes a confusable word table 133 that maps commonly confused words to the words with which they are commonly confused (i.e., possibly intended words). For example, the word "add" would be mapped to the word "ad" to indicate that authors may incorrectly use the word "add" instead of "ad." The confulsable word table may also be stored on the storage device, or on a removable medium using the removable media drive. While the parser is preferably implemented on a computer system configured as described above, those skilled in the art will recognize that it may also be implemented on computer systems having different configurations.

Figure 2:
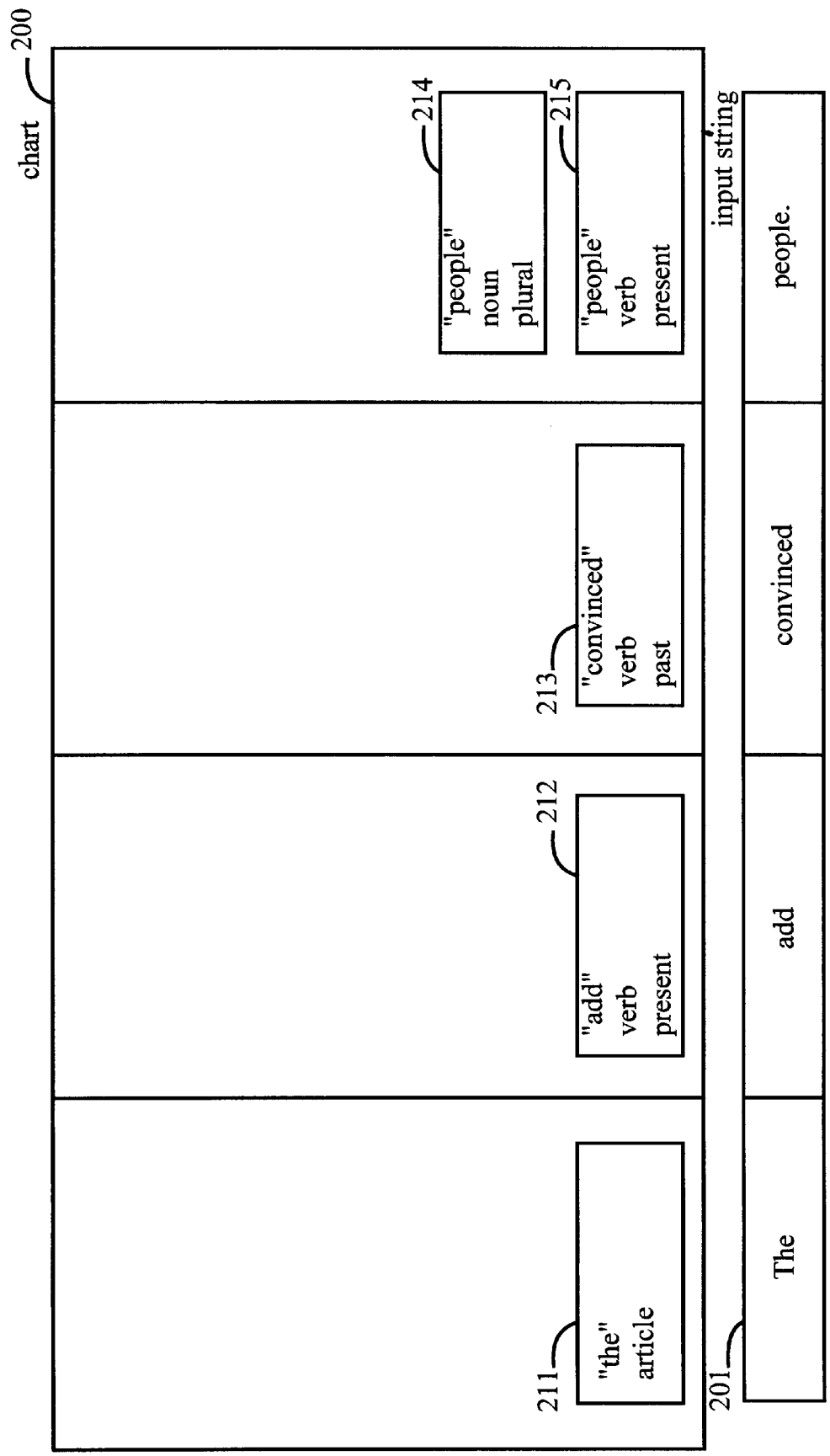
FIG. 2 is a chart diagram showing the parser adding part-of-speech records to the chart for words occurring in the input text.

An example illustrating the application of the adapted parser to parse input text while identifying and resolving commonly confused words is discussed herein in conjunction with FIGS. 2–7. FIG. 2 is a chart diagram that shows the parser adding part-of-speech records to the chart for words occurring in the input text, including any words occurring in the input text that are potentially confused. FIG. 2 shows the sample input string 201 "The add convinced people." FIG. 2 further shows the contents of the parser's chart 200 after the parser adds to the chart part-of-speech records for words occurring in the input text. The chart contains parts of speech records 211–215, one or more of which represent each word occurring in the input text. Part-of-speech record 211 represents the word "the," part-of-speech record 212 represents the word "add," part-of-speech record 213 represents the word "convinced," and part-of-speech records 214 and 215 represent the word "people." Each part-of-speech record contains an indication of one possible part of speech that its word can represent, as well as additional related lexical information, such as verb tense for verb part-of-speech records. The possible part of speech and other lexical information are preferably retrieved from a dictionary entry for the word occurring in the input string.

Figure 3:
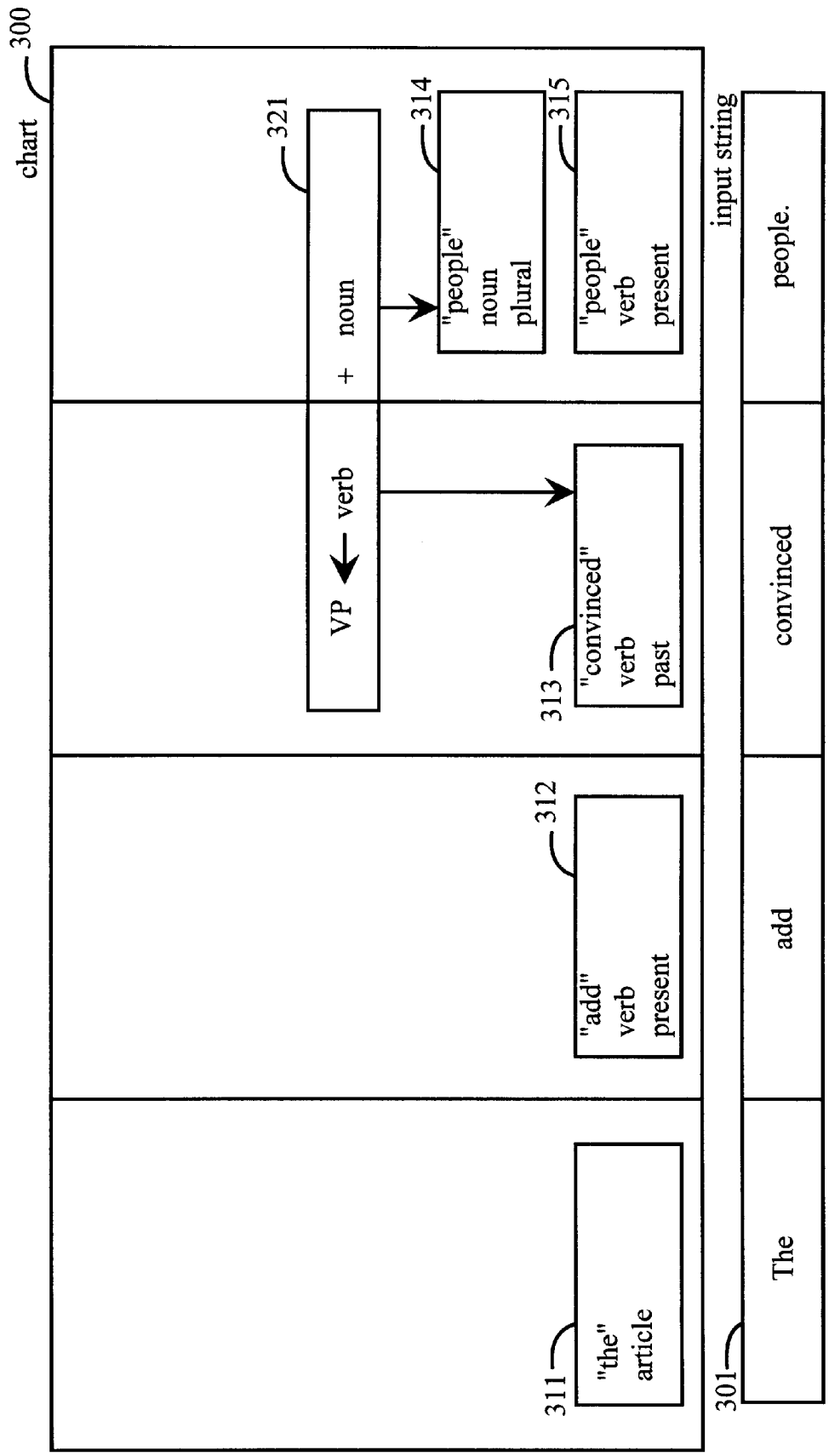
FIG. 3 is a chart diagram showing the parser applying rules implicated by the contents of the chart.

FIG. 3 shows the parser applying rules implicated by the contents of the chart. That is, the parser applies rules that may combine records of the type that are already present in the chart. FIG. 3 shows the application of a rule that transforms a verb and a noun into a verb phrase, or "VP." The application of this rule creates a verb phrase record 321 that combines the verb part-of-speech record for the word "convinced" 313 with the noun part-of-speech record for "people" 314. Both part-of-speech records and records created by rules may implicate additional rules. These additional rules are reiteratively applied. In the case of the example, no other rules may successfully be applied to combine records in the chart.

If a complete parse has been produced by the application of these rules (that is, if a sentence record has been created covering all of the words in the input string), then parsing concludes and the complete parse is returned, else the parser continues. If the input text contains potentially confused words, then the parser continues, else the parser is unable to produce a complete parse and returns failure. FIG. 4 is a table diagram showing a sample confusable word table used to identify potentially confused words in the input text. The confusable words table 400 contains a potentially confused word column and a possibly intended words column. In each row, the potentially confuised word column contains a word that may be confused for one or more other words. In that row, the possibly intended words column contains a list of one or more possibly intended words with which the potentially confused word may be confused. For example, line 402 shows that the word "add" may be confused with the word "ad." Line 401 shows that the opposite is also true: that the word "ad" may be confused with the word "add." Some potential confusions between words are unidirectional: that is, one word of a pair may be potentially be confused with another word of the pair (e.g., line 403 indicates that "cant" may be confused with "can't"), but the converse is not true (e.g., "can't" does not appear in the potentially confused word column). Lines 409–411 show that a potentially confused word may be confused with two or more possibly intended words. The parser compares the words in the input text to the words in the potentially confused word column of the confusable word table. If any words in the input string match words in the potentially confused word column, then the input text contains potentially confused words.

Figure 5:
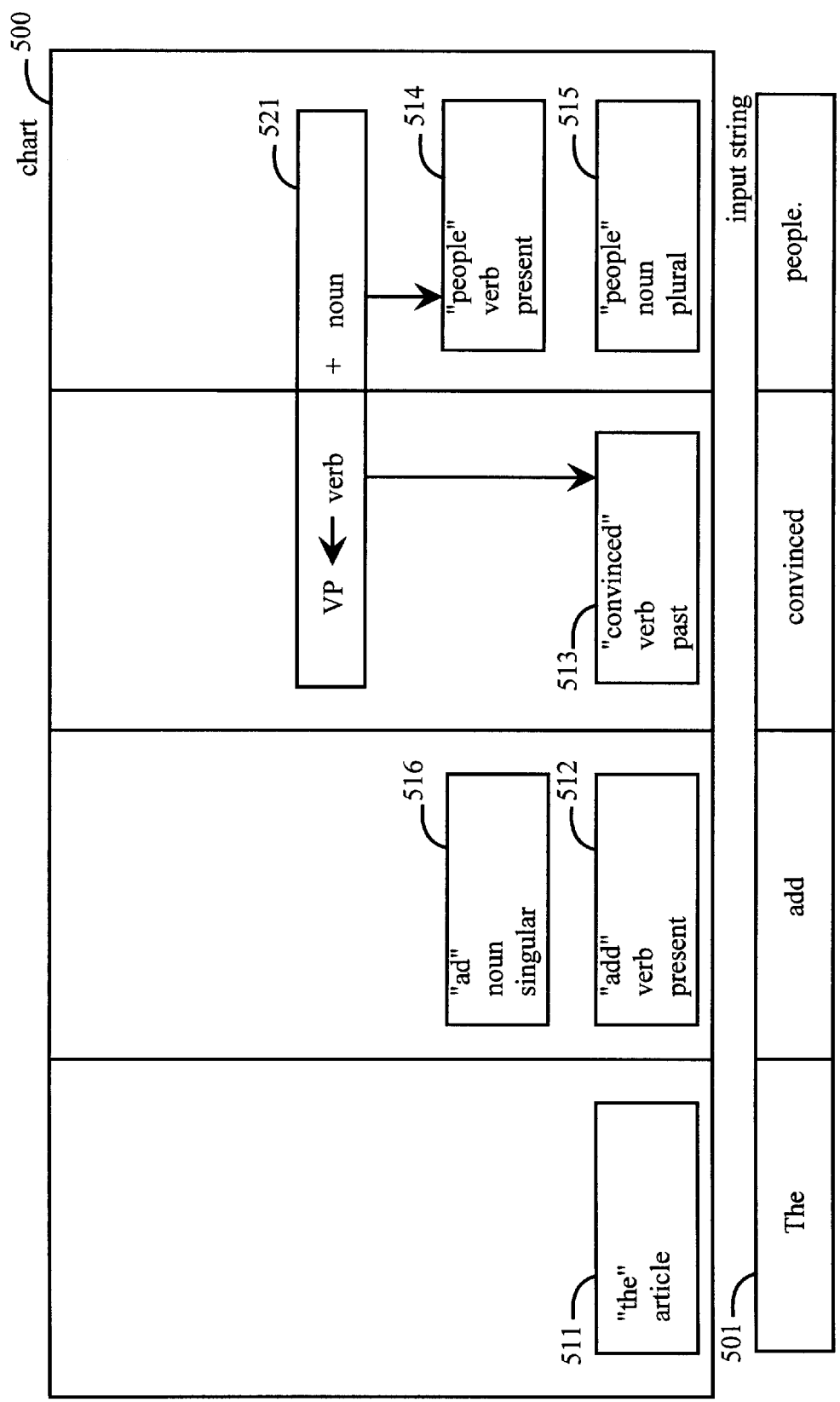
FIG. 5 is a chart diagram showing the parser adding part-of-speech records to the chart for possibly intended words corresponding to potentially confused words identified in the input text.

FIG. 5 is a chart diagram that shows the parser adding part-of-speech records to the chart for possibly intended words corresponding to the potentially confused words identified in the input text. The parser preferably adds to the chart part-of-speech records for possibly intended words that have different parts of speech than their potentially confused words. E.g., the parser preferably adds a noun part-of-speech record for the possibly intended word "ad" because its part of speech differs from the possible parts of speech for its potentially confused word "add." The parser preferably also adds to the chart part-of-speech records for possibly intended words that have different tenses than their potentially confused words. E.g., the parser preferably adds a present tense verb part-of-speech record for the possibly intended word "mind" because its tense differs from the past tense of the verb form of the potentially confused word "mined." The parser preferably also adds to the chart part-of-speech records for possibly intended words that have different numbers than their potentially confused words. E.g., the parser preferably adds a plural noun part-of-speech record for the possibly intended word "laps" because its number differs from the singular noun form of the potentially confused word "lapse." Further, for a particular set of confused words, the user may preferably specify that part-of-speech records are added to the chart for words in the set even if they have the same part of speech, tense, and number. FIG. 5 shows that the parser has added a noun part-of-speech record for the word "ad" 516 to the chart, since line 402 indicates that the word "add," which appears in the input string, may be confused with the word "ad," for which the dictionary specifies noun as a possible part of speech.

Figure 6:
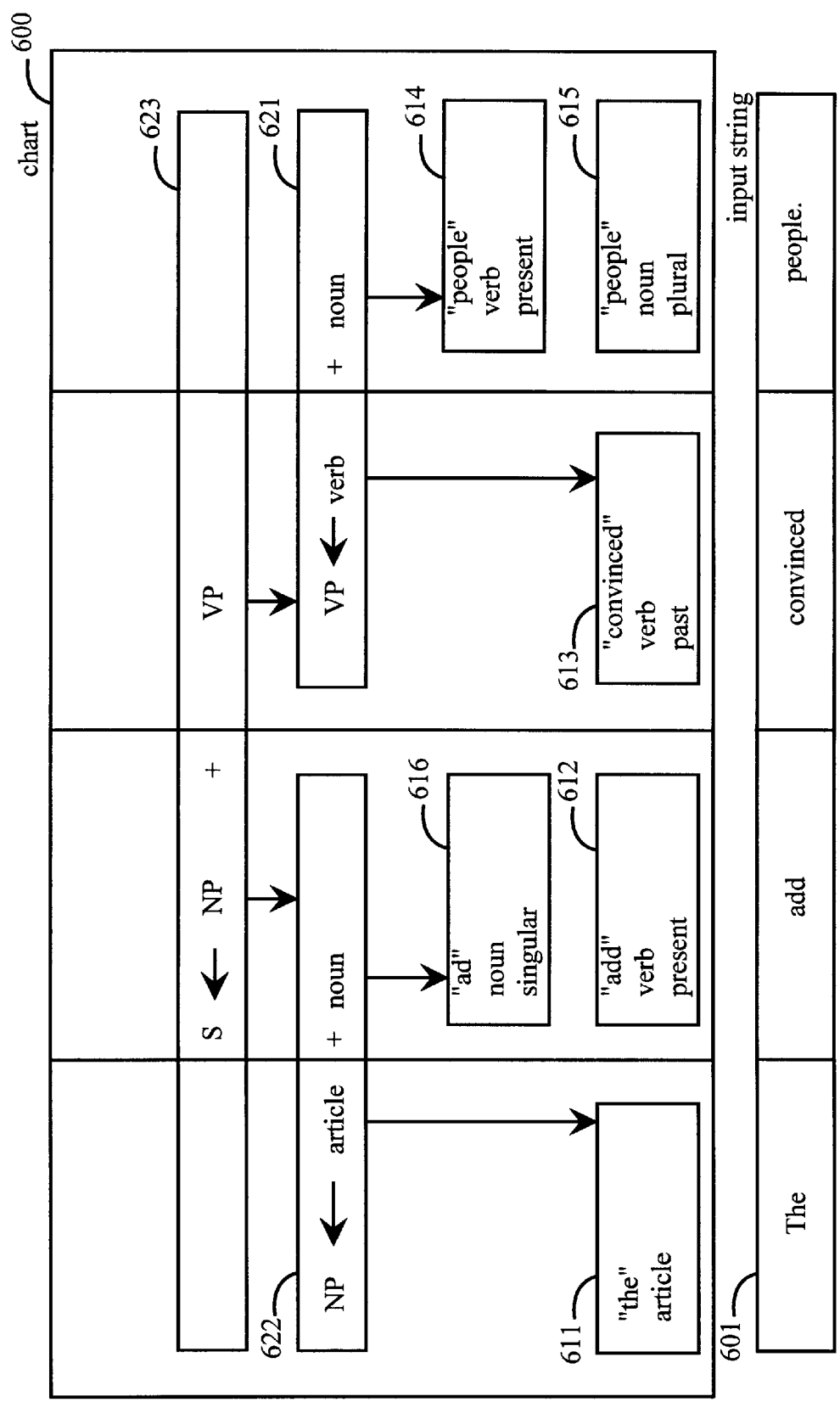
FIG. 6 is a chart diagram showing the parser applying the rules implicated by the contents of the chart after the addition of parts of speech records for possibly intended words to the chart.

FIG. 6 is a chart diagram showing the parser applying rules implicated by the contents of the chart after the addition of part-of-speech records for possibly intended words in the chart. FIG. 6 shows that the parser has applied rules creating records 622 and 623 in the chart. Record 622 combines the article part-of-speech record for "the" 611 with the noun part-of-speech record 616 for the possibly intended word "ad" into a noun phrase ("NP"). Record 623 combines noun phrase record 622 and verb phrase record 621 into a sentence. Record 623 further "covers" each word in the input string, in that it constitutes the head node of a tree having leaves that represent each of the words in the input text.

If the application of rules implicated by the contents of the chart after the addition of part-of-speech records for alternate words produced a complete parse, then the parser returns qualified success, else the parser returns failure. It can be seen from FIG. 6 that, in the example, the parser has produced a complete parse in that sentence record 623 covers all of the words of the input text, and therefore returns qualified success.

Figure 7:
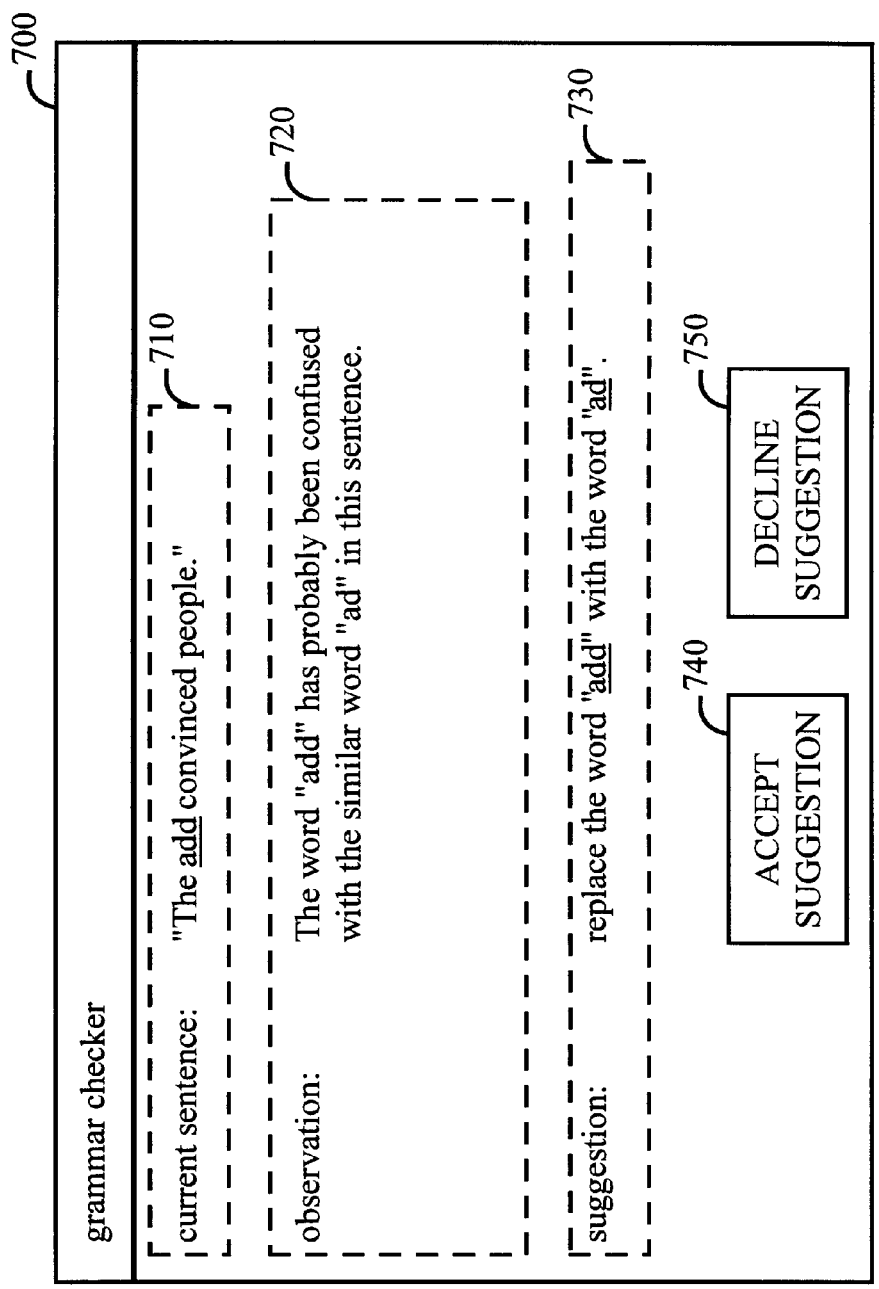
FIG. 7 is a screen diagram showing the visual user interface of a grammar checker utilizing the parser.

FIG. 7 is a screen diagram showing the visual user interface of a grammar checker utilizing the parser. The grammar checker user interface preferably displays a window 700. The window 700 preferably contains the sentence currently being checked 710. The window further preferably contains an indication 720 that a particular word in the current sentence is probably confused with another word. The window preferably also contains a suggestion 710 that the potentially confused word be replaced. Finally, the window preferably contains a button 450 that the user can select to accept the suggestion and replace the potentially confused word and a button 750 that the user may select to decline the suggestion and omit to replace the potentially confused word.

Figure 8:
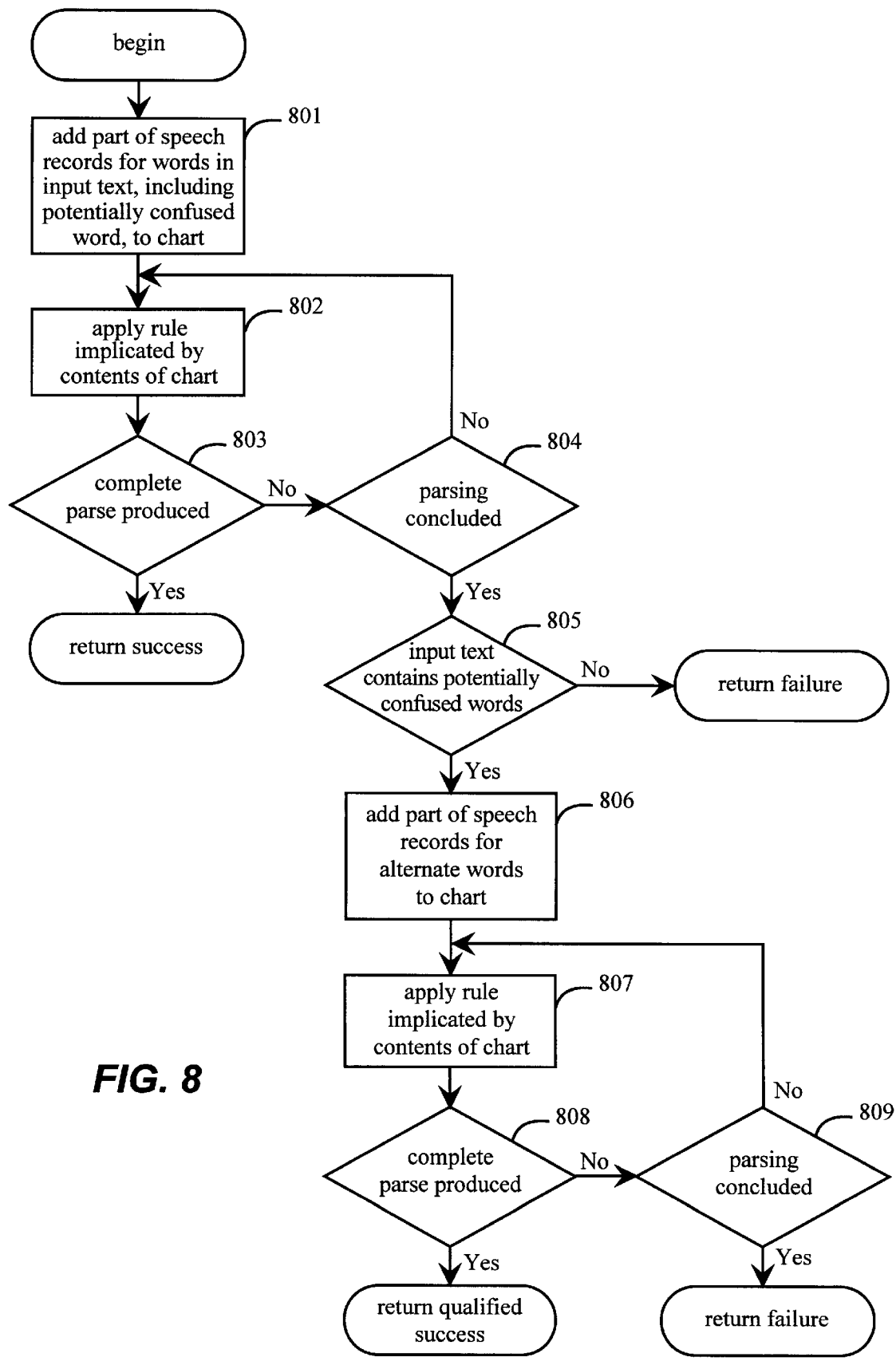
FIG. 8 is a flow diagram showing the high-level steps preferably performed by the adapted parser in order to parse input text while identifying and resolving commonly confused words.

FIG. 8 is a flow diagram showing the high-level steps preferably performed by the adapted parser in order to parse input text while identifying and resolving commonly confused words. In step 801, the parser adds part-of-speech records to the chart for words occurring in the input text, including any words occurring in the input text that are potentially confused. In step 802, the parser applies one of the rules implicated by the contents of the chart. In step 803, if a complete parse has been produced by the application of rules in step 802 (that is, if a sentence record has been created covering all of the words in the input string), then these steps conclude and the complete parse is returned, else the parser continues in step 804. In step 804, if parsing has nonetheless concluded, i.e., if all of the implicated rules have been applied or the total number of rules that have been applied exceeds an upper limit, then the parser continues at step 805, else the parser continues at step 802 to apply another implicated rule. In step 805, if the input text contains potentially confused words, then the parser continues in step 806, else the parse is unable to produce a complete parse and returns failure. To determine whether the input text contains potentially confused words, the parser compares the words in the input text to the words in the potentially confused word column of the confusable word table. If any words in the input string match words in the potentially confused word column, then the input text contains potentially confused words. In step 806, the parser adds part-of-speech records to the chart for possibly intended words corresponding to the potentially confused words identified in the input text. In step 807, the parser applies one of the rules implicated by the contents of the chart after the addition of part-of-speech records for alternate words in step 806. In step 808, if a complete parse has been produced, then the parser returns qualified success, else the parser continues at step 809. In step 809, if parsing has nonetheless concluded, i.e., if all the implicated rules have been applied or the total number of rules that have been applied exceeds an upper limit, then the parser returns failure, else the parser continues at step 807 to apply another implicated rule.

Figure 9:
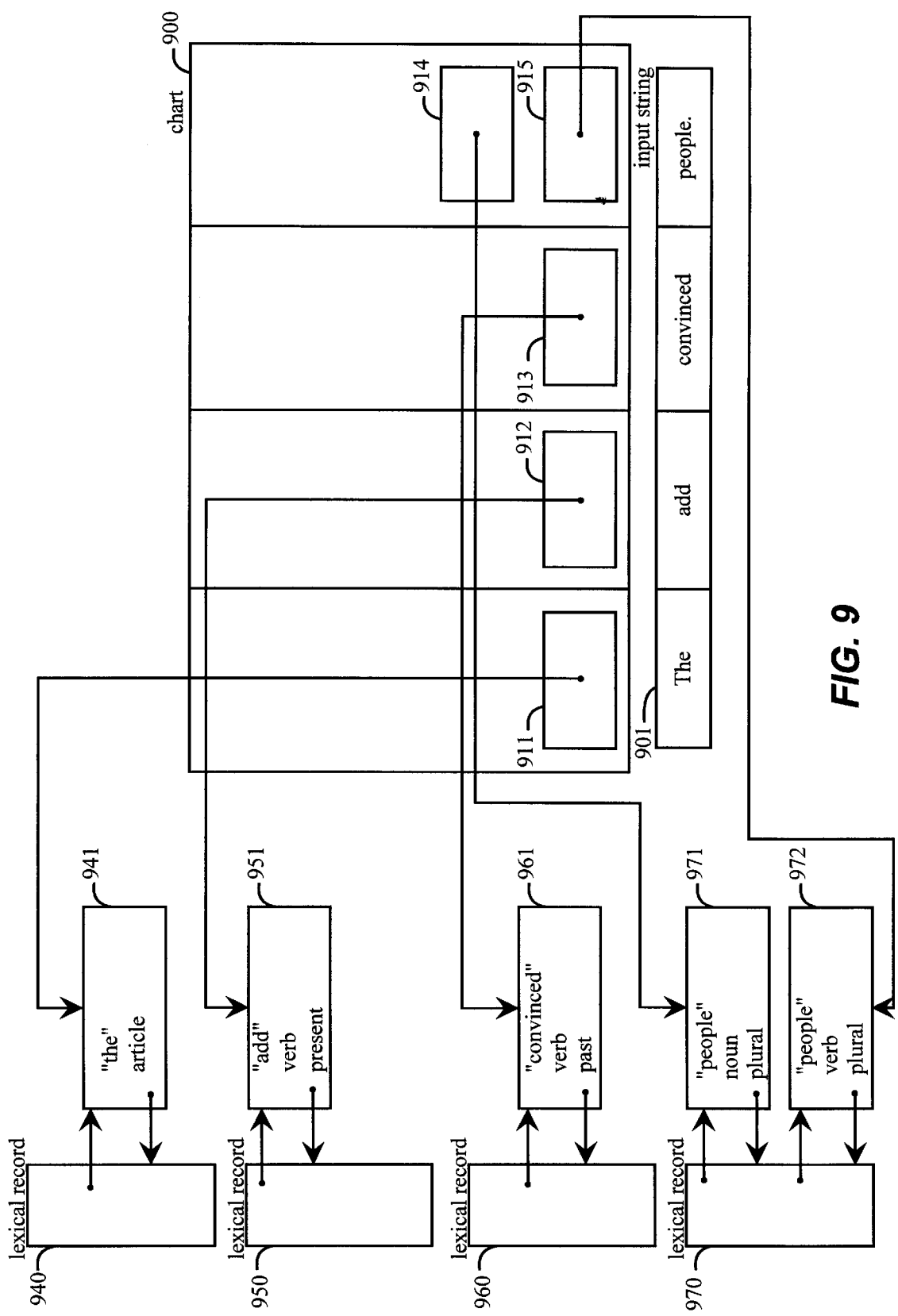
FIG. 9 shows an alternate view of FIG. 2 including lexical records from the dictionary, which illustrates the contents of the chart after the performance of step 801 and before the application of rules.
Figure 10:
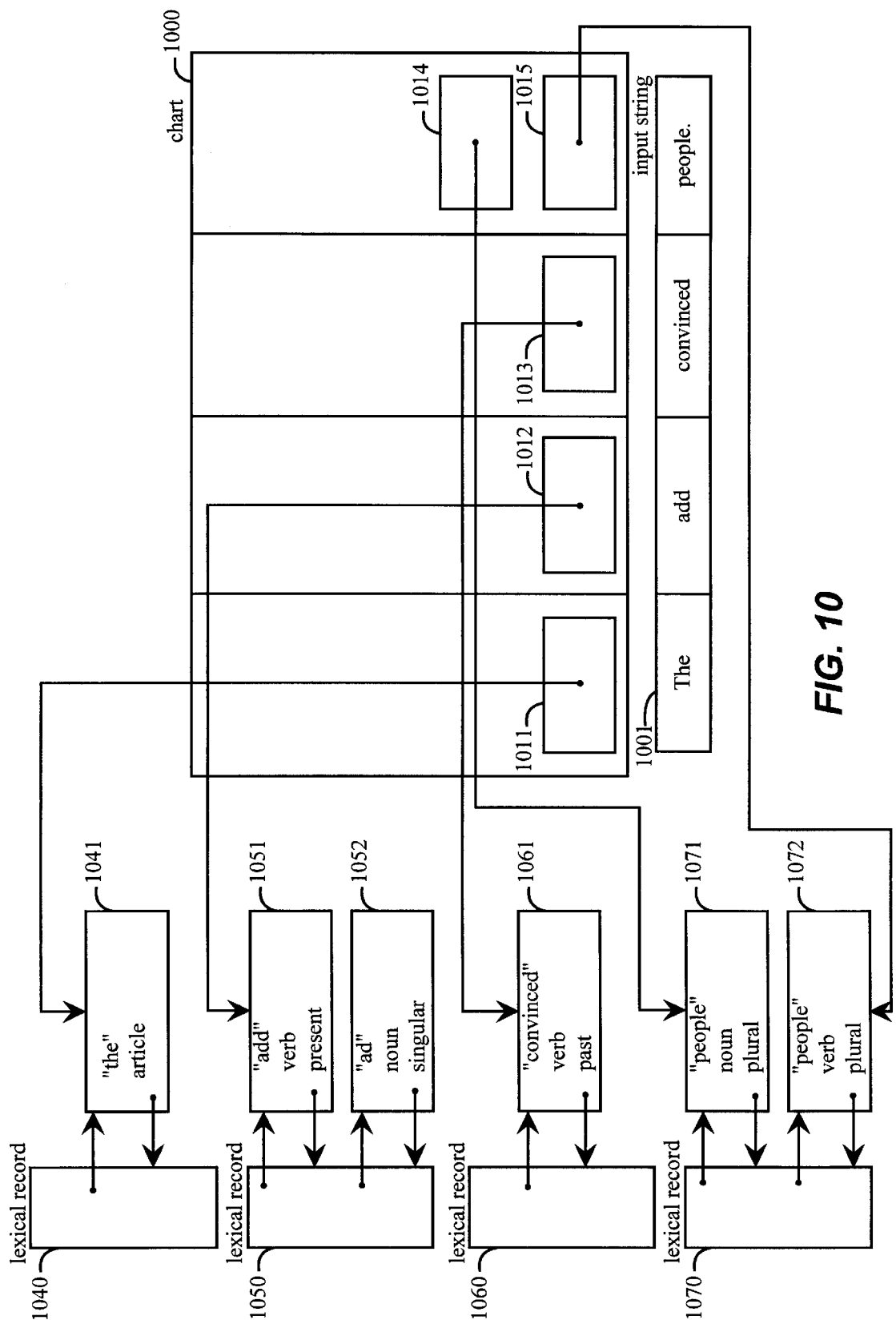
FIG. 10 shows the linking of a part-of-speech data structure for an alternate word to the lexical record data structure for its potentially confused word.
Figure 11:
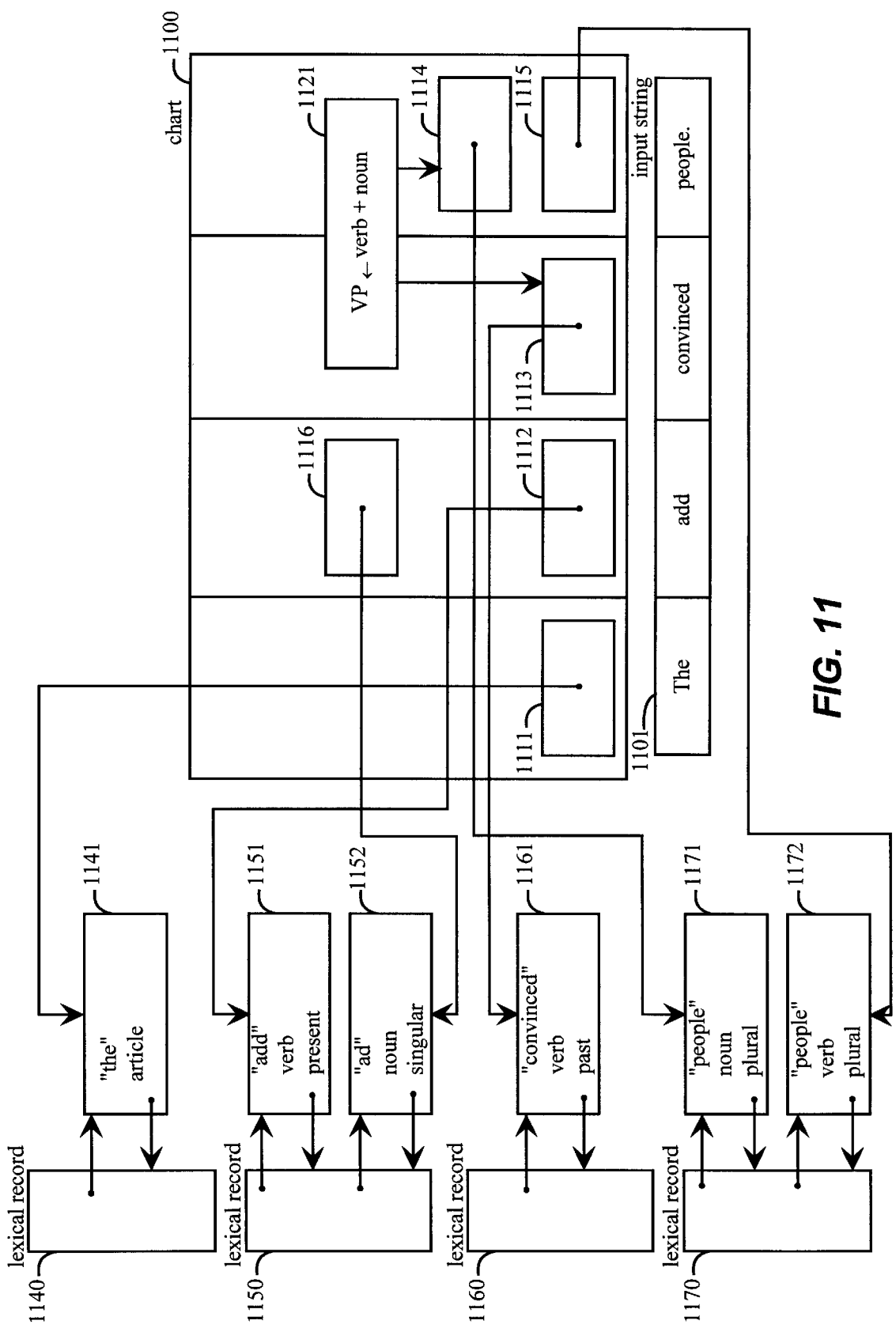
FIG. 11 shows the contents of the chart after the addition of a part-of-speech record for a possibly intended word.

Some grammar rules, while they are applied to particular parts of speech for each word, consider all possible parts of speech that each word may represent. Such grammar rules can reduce the quantity of processing resources required to apply rules unlikely to contribute to the production of a complete parse. To support such rules, part-of-speech records can be linked together so that all of the possible parts of speech for a word may be easily determined. In accordance with a preferred embodiment of the invention, part-of-speech records for possible intended words are preferably linked to part-of-speech records for their potentially confused words of the beginning of the parsing process. FIGS. 9–11 illustrate this feature of the invention. FIG. 9 shows an alternate view of FIG. 2, which illustrates the contents of the chart after the performance of step 801 before the application of rules. Instead of containing data about potential parts of speech represented by words in the input text, part-of-speech records 911–915 contain pointers to data structures containing this information. For example, part-of-speech record 914 contains a pointer to part-of-speech data structure 971, which contains the potential part-of-speech noun, as well as other related lexical information. According to an alternate preferred embodiment (not shown), data is copied from the part-of-speech data structure to the part-of-speech record to eliminate the time cost of dereferencing a pointer to the part-of-speech data structure. Part-of-speech data structure 971 contains a bidirectional link to a lexical record 970 representing the word "people." Another data structure 972 contains possible part-of-speech verb for the word "people," and also contains a bidirectional link to lexical record 970. The links between part-of-speech data structures 971 and 972 and lexical record data structure 970 enable rules to base their processing on the set of all possible parts of speech for a particular word. In the case of noun part-of-speech record 914 for the word "people," rules that are applied to this record may take into account that the word "people" may also represent a verb.

FIG. 10 shows a further modification of the chart in accordance with this feature of the invention. FIG. 10 shows the linking of a part-of-speech data structure for a possibly intended word to the lexical record data structure for its potentially confused word. FIG. 10 shows the addition of a part-of-speech data structure 1052 for the noun form of the word "ad" to the lexical record for "add" 1050. Because both part-of-speech data structures 1051 and 1052 are bidirectionally linked to the lexical data structure for the word "add" 1050, rules applied to the verb part-of-speech record for "add" 1012 can consider a noun possible part of speech for this word. As discussed above, in accordance with the invention, part-of-speech data structures for possible parts of speech of possibly intended words are preferably linked to the lexical data structure for each possibly confused words in order to facilitate the application of rules whose behavior is based on the other possible parts of speech for a word to be combined by the rule. FIG. 11 shows that, in accordance with this feature of the invention, when the noun part-of-speech record 1116 is added to the chart in step 806, it contains a pointer to part-of-speech data structure 1152 containing the potential part-of-speech noun for the possibly intended word "ad."

In addition to increasing the efficiency of parsing by preventing the application of rules unlikely to contribute to the production of a complete parse, the use of rules that refer to the linked part-of-speech records for possibly intended words can prevent the parser from producing an apparently correct completed parse of the input text using the potentially confused word in cases in which the potentially confused word was actually confused with the possibly intended word. This is true of the following sample sentence, in which the confused word "form" is used in place of the intended word "from":

Angela departed form Seattle.

Using rules that do not consider possible parts of speech of possibly intended words, some parsers produce a completed parse of this sentence in which a verb phrase is formed from the verb phrase "departed" and the noun phrase "form Seattle." This completed parse is actually incorrect, as "form Seattle" is not a valid object of the verb "departed." Using rules that do consider possible parts of speech of possibly intended words, however, a parser can avoid this incorrect completed parse. In this case, application of the rule for combining a verb phrase and a noun phrase that is the object of the verb phrase into another verb phrase is blocked whenever the "premodifier" of the noun phrase (that is, "form," the word occurring before the main word of the noun phrase, "Seattle") or its possibly intended words can represent the preposition part of speech, given a considerable likelihood that the preposition part of speech was intended before the object of a verb. Because the possibly intended word "from" can have the preposition part of speech and the preposition part-of-speech record is linked to the part-of-speech records for the potentially confused word "form," application of this rule is blocked, preventing the parser from creating the incorrect completed parse described above, thereby improving the accuracy of the parser's output.

Figure 12:
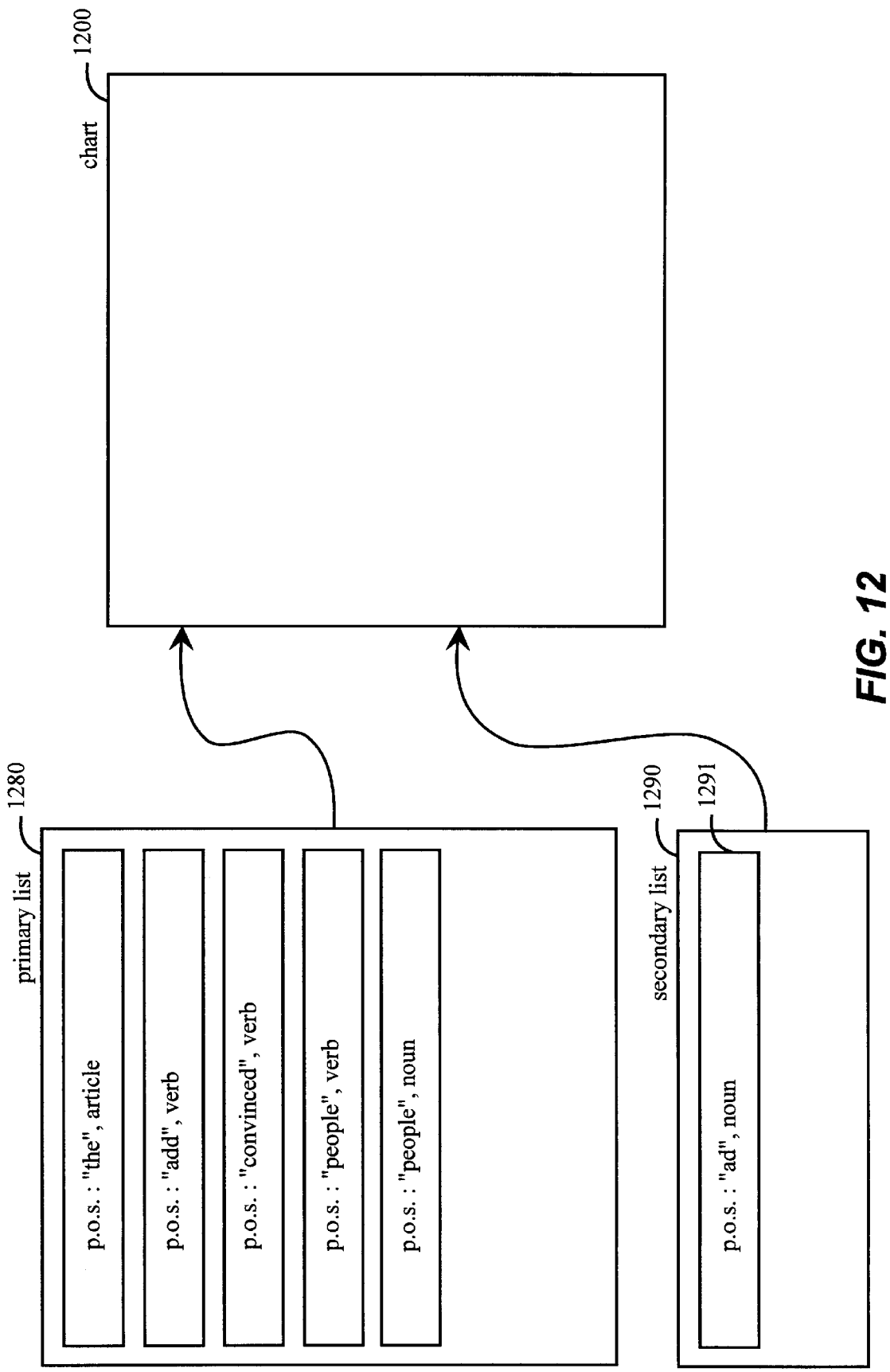
FIG. 12 shows an embodiment in which part-of-speech records are added to the chart from two different lists.
Figure 13:
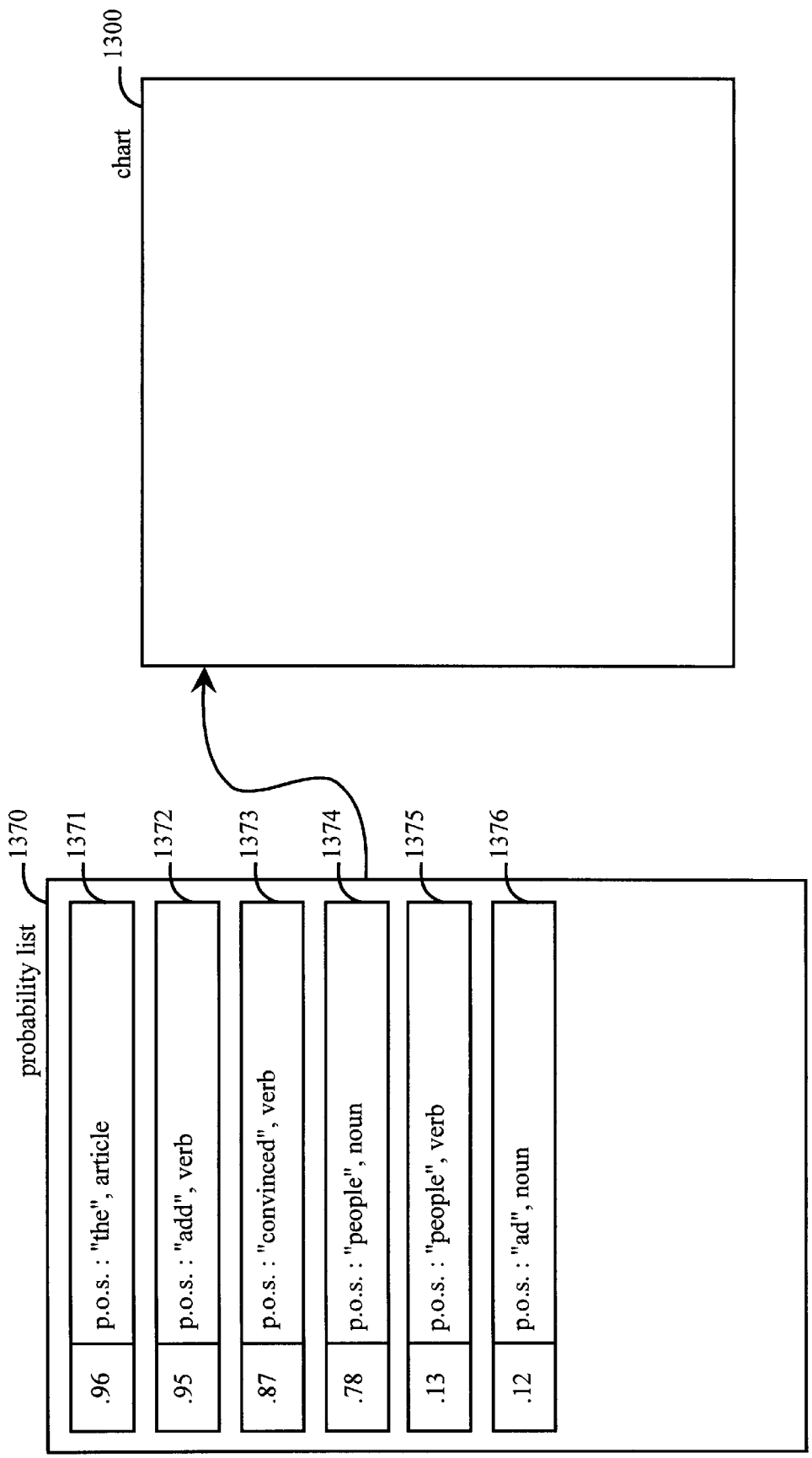
FIG. 13 shows another embodiment in which part-of-speech records are added to the chart from a single list ranked by probability.

FIGS. 12 and 13 illustrate two preferred embodiments for causing part-of-speech records for alternate words to be added to the chart after part-of-speech records for potentially confused words are added to the chart and having implicated rules applied to them in accordance with step 805. FIG. 12 shows an embodiment in which part-of-speech records are added to the chart 1200 from two different lists, or "queues": a primary list 1280 and a secondary list 1290. Part-of-speech records for words contained in the input text are stored in the primary list 1280. It can be seen that the primary list contains part-of-speech records for the words "the," "add," "convinced," and "people," which appear in the input text. The secondary list 1290 contains part-of-speech records for possibly intended words. It can be seen that secondary list 1290 contains a noun part-of-speech record for alternate word "ad." In this embodiment, words are added to the chart from the primary list first. After implicated rules have been applied, the parser then adds to the chart part-of-speech records from the secondary list. In a preferred embodiment, adding part-of-speech records from the secondary list to the chart involves first moving them from the secondary list to the primary list, then adding them to the chart from the primary list, while also applying newly implicated rules that appear in the primary list. This approach enables a parse tree to be constructed from part-of-speech records for words included in the input text before possibly intended words with which words in the input text are commonly confused are added to the chart.

FIG. 13 shows another embodiment in which part-of-speech records are added to the chart 1300 from a single list 1370. List 1370 is a probability list, and is sorted according to the probability of each part-of-speech record ultimately constituting a leaf of a completed parse tree. For a more complete discussion of probability-directed parsers, see U.S. patent application Ser. No. 08/265,845, "METHOD AND SYSTEM FOR BOOTSTRAPPING STATISTICAL PROCESSING INTO A RULE-BASED NATURAL LANGUAGE PARSER," which is hereby incorporated by reference. Part-of-speech records are added to the chart from the probability list in descending order of their probability of constituting a leaf of a successful parse tree. These probabilities, also called "application priority values," are preferably generated by statistically analyzing the appearance of each part-of-speech record in completed parse trees for a representative corpus of input text segments. For example, the statistics shown in conjunction with part-of-speech records 1374 and 1375 indicate that, in input text segments containing the word "people," 78% of the time the word "people" represented a noun in a complete parse of the input segment, while in 13% of the cases it represented a verb. In this embodiment, part-of-speech records for possibly intended words are preferably assigned a relatively small probability, causing them to be added to the chart near the end of processing. This may be accomplished in several ways: The probability that the noun form of the word "ad" will form the leaf of a complete parse tree when "ad" appears in the input text may be reduced because the word "ad" does not actually occur in the input text. Alternatively, separate statistics may be maintained to calculate the probability that the noun form of the word "ad" will form a leaf of a completed parse tree when the word "add" rather than the word "ad" appears in the input text. Either way, the part-of-speech record for alternate word "ad" is added to the chart after the part-of-speech record for potentially confused word "add." Finally, the probability of part-of-speech records for possibly intended words may be set to be equal to or less than the smallest probability in the probability list.

In a further preferred embodiment, the two approaches to causing part-of-speech records for alternate words to be added to the chart after part-of-speech records for potentially confused words are added to the chart are combined so that part-of-speech records for potentially intended words are stored in the secondary list, and all of the rules and the part-of-speech records ending up in the primary list are ordered by their probabilities.

Figure 14:
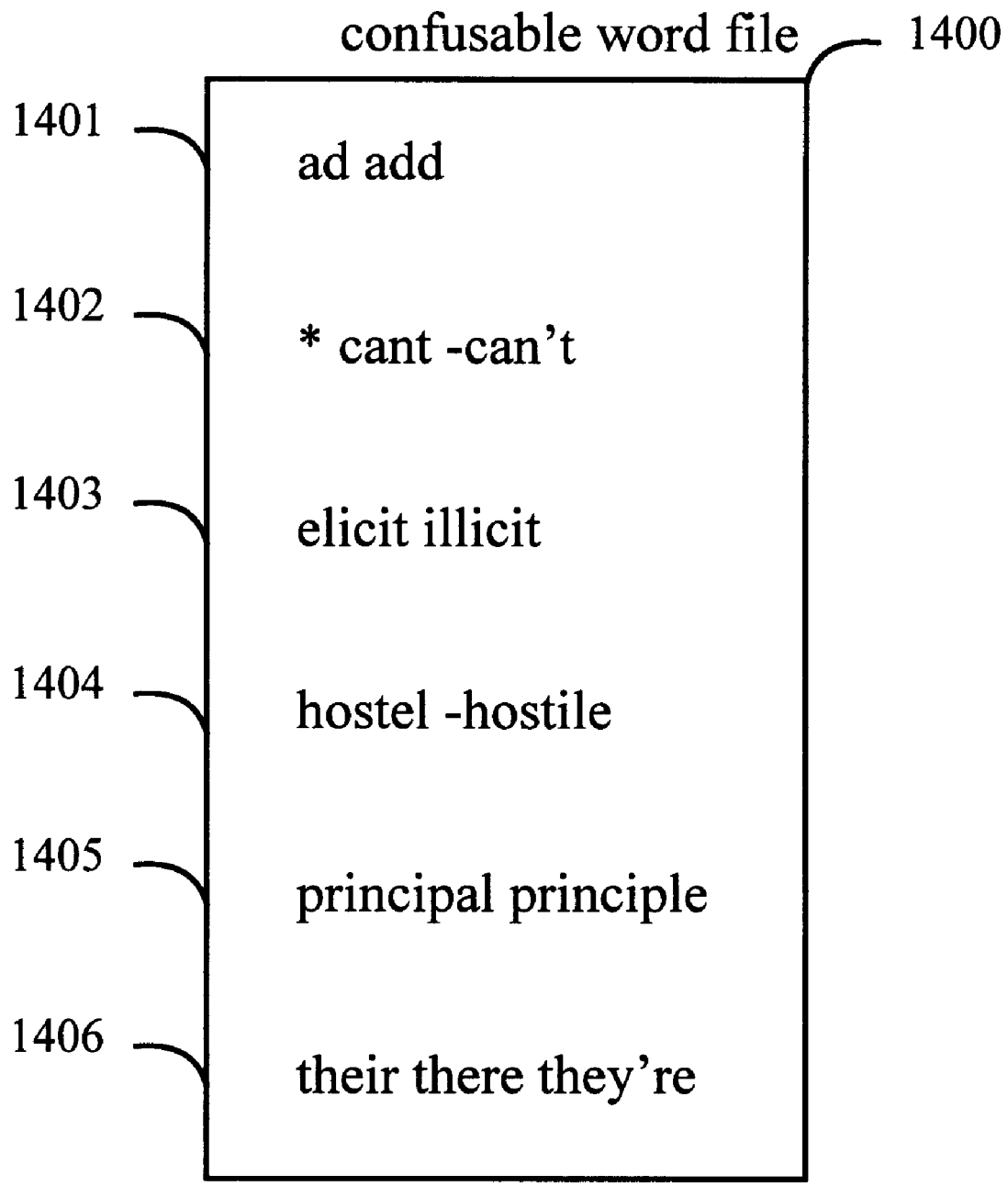
FIG. 14 shows a simplified confusable word file.

Users may preferably configure the parser to modify the list of potentially confused words or the possibly intended words that may be substituted for potentially confused words. Users may do so by modifying the confusable word table shown in FIG. 4. However, some users may prefer to modify a simpler representation of the confusable word list. FIG. 14 shows a simplified confusable word file 1400. The lines 1401–1406 each correspond to one set of potentially confused words. Unless otherwise indicated, the words appearing together on a line may all be confused with each other. For instance, line 1401 indicates that the word "ad" may be confused with the word "add" and vice versa. The confusable word file also preferably enables the user to specify unidirectional confusion relationships by preceding words that should not be considered to be potentially confused with a hyphen ("-"). For example, the hyphen before the word "can't" on line 1401 indicates that the word "cant" may be potentially confused with the word "can't," but that the word "can't" is not potentially confused with the word "cant." The confusable word file also preferably enables the user to specify that words in a potentially confused set may be substituted for each other despite the fact that they have the same parts of speech, number, and tense with an asterisk ("*"). For example, the asterisk before confusable set 1402 indicates that the word "can't" may be substituted for the word "cant," even though these words both have the verb part of speech. The parser preferably permits users to modify the confusable word file 1400 to configure the operation of a parser, and translates the confusable word file into a form more readily applied by the parser, such as the confusable word table shown in FIG. 4.

While this invention has been shown and described with reference to preferred embodiments, it will be understood by those skilled in the art that various changes or modifications in form and detail may be made without departing from the scope of the invention. For example, other mechanisms besides those described above may be used to introduce into the chart part-of-speech records for commonly confused words. Further, the described embodiments of the invention may be straightforwardly adapted to parse text of an artificial language, such as a computer programming language or a text markup language.

We claim:

1. A method in a computer system for parsing a segment of natural language input text containing one or more words using grammar rules and a dictionary containing a plurality of entries, each dictionary entry corresponding to a word in the natural language and specifying one or more possible parts of speech for the word, the method comprising the steps of:
   (a) creating a chart for containing a parse tree representing the input text segment and parsing results intermediate thereto;
   (b) for each word occurring in the input text segment, creating a part-of-speech record in the chart for the word specifying a part of speech specified by the dictionary entry for the word;
   (c) identifying a word occurring in the input text segment that is commonly confused with another word;
   (d) creating a part-of-speech record in the chart for the identified word specifying a part of speech specified by the dictionary entry for the word commonly confused with the identified word; and
   (e) applying the grammar rules to both the part-of-speech records created in step (b) and those created in step (d).

2. The method of claim 1 wherein the method further uses a list of commonly confused words that contains, for each commonly confused word, a word with which the word is commonly confused, and wherein step (c) includes the step of matching one of the words occurring in the input text segment with one of the words in the list.

3. The method of claim 1 wherein step (b) creates in the chart, for each word occurring in the input text segment, part-of-speech records specifying each of the possible parts of speech specified in the dictionary entry for the word; and wherein the method further includes the step of, for each word in the input text segment, linking together the parts of speech records created in the chart for the word; and wherein the application of one or more of the grammar rules to a part-of-speech records involves determining other possible parts of speech for the word by examining the other parts of speech record to which the part-of-speech record is linked; and wherein the method further comprises the step of linking the part-of-speech record created in step (d) to the part-of-speech records created for the identified word in step (b).

4. The method of claim 1 wherein step (d) is performed after performance of step (e) begins.

5. The method of claim 1 where in step (d) is performed after the application of grammar rules to part-of-speech records created in step (b) concludes.

6. A method in a computer system for loading into a parser a list of rules and lexical records for the parser to apply when parsing a segment of natural language input text containing words, each contained word having associated with it lexical information, the method comprising the steps of:
   (a) adding to the list lexical records, each lexical record specifying lexical information associated with one of the words contained in the input text segment;
   (b) identifying a word contained in the input text that is commonly confused with another word;
   (c) adding to the list a lexical record specifying lexical information associated with the word with which the identified word is commonly confused; and
   (d) adding to the list rules that can be applied to the lexical records added to the list in steps (a) and (c).

7. The method of claim 6, further comprising the step of:
   (e) applying the lexical records and rules added to the list in steps (a), (c), and (d) in order to parse the input text segment.

8. The method of claim 7, further comprising the steps of:
   (f) adding to the list rules that can be applied to the lexical records added to the parser list in step (a); and
   (g) applying the lexical records and rules added to the list in steps (a) and (f), and wherein steps (b), (d), and (e) are performed after steps (a), (f), and (g).

9. The method of claim 6 wherein each rule and lexical record has associated with it an application priority value, and wherein step (e) applies rules and lexical records in the list in decreasing order of their application priority value, and wherein the application priority value associated with the lexical record for the word with which the identified word is commonly confused is smaller than the application priority value associated with lexical record for the identified word.

10. The method of claim 9 wherein the application priority value associated with the lexical record for the word with which the identified word is commonly confused is set to be equal to the smallest application priority value associated with a lexical record added to the list in step (a).

11. The method of claim 6 wherein the lexical records added to the list for each word in the input text segment are linked together to facilitate the application of rules that utilize more of the word's lexical information than is contained in a single lexical record, the method further comprising the step of linking the lexical record for the word with which the identified word is commonly confused to any lexical records added to the chart for the identified word.

12. A method in a computer system for parsing input text made up of a plurality of words using a relation that maps from each of a plurality of potentially confused words to a possibly intended word, a word of the input text being a potentially confused word mapped by the relation to a possibly intended word not occurring in the input text, each word of the input text and each possibly intended word having one or more possible parts of speech, the method comprising:

identifying the possible parts of speech for each word of the input text including the potentially confused word;

identifying the possible parts of speech for the possibly intended word; and applying syntactic grammar rules to the identified parts of speech, such that a complete syntax tree containing a possible part of speech for the possibly intended word is produced and no complete syntax tree containing a possible part of speech for the potentially confused word is produced.

13. A computer-readable medium whose contents cause a computer system to parse a segment of natural language input text containing one or more words using grammar rules, a dictionary containing a plurality of entries, and a chart for containing a parse tree representing the input text segment and parsing results intermediate thereto, each dictionary entry corresponding to a word in the natural language and specifying one or more possible parts of speech for the word, by performing the steps of:

(a) for each word occurring in the input text segment, creating a part-of-speech record in the chart for the word specifying a part of speech specified by the dictionary entry for the word;

(b) identifying a word occurring in the input text segment that is commonly confused with another word;

(c) creating a part-of-speech record in the chart for the identified word specitfying a part of speech specified by the dictionary entry for the word commonly confused with the identified word; and (d) applying the grammar rules to both the part-of-speech records created in step (a) and those created in step (c).

14. The computer-readable medium of claim 13 wherein the contents of the computer-readable medium further cause the computer system to use a list of commonly confused words that contains, for each commonly confused word, a word with which the word is commonly confused, and wherein step (b) includes the step of matching one of the words occurring in the input text segment with one of the words in the list.

15. The computer-readable medium of claim 13 wherein step (a) creates in the chart, for each word occurring in the input text segment, part-of-speech records specifying each of the possible parts of speech specified in the dictionary entry for the word; and wherein the method further includes the step of, for each word in the input text segment, linking together the parts of speech records created in the chart for the word; and wherein the application of one or more of the grammar rules to a part-of-speech records involves determining other possible parts of speech for the word by examining the other parts of speech record to which the part-of-speech record is linked; and wherein the contents of the computer-readable medium further cause the computer system to perform the step of linking the part-of-speech record created in step (c) to the part-of-speech records created for the identified word in step (a).

16. The computer-readable medium of claim 13 wherein the contents of the computer-readable medium further cause the computer system to perform step (c) after performance of step (d) begins.

17. The computer-readable medium of claim 13 wherein the contents of the computer-readable medium further cause the computer system to perform step (c) after the application of grammar rules to part-of-speech records created in step (b) concludes.

18. A computer-readable medium whose contents cause a computer system to parse input text made up of a plurality of words using a relation mapping from each of a plurality of potentially confused words to a possibly intended word, a word of the input text being a potentially confused word mapped to a possibly intended word by the relation, each word of the input text and each possibly intended word having one or more possibly parts of speech, by:

identifying the possible parts of speech for each word of the input text including the potentially confused word;

identifying the possible parts of speech for the possibly intended word; and applying syntactic grammar rules to the identified parts of speech, such that a complete syntax tree containing a possible part of speech for the possibly intended word is produced and no complete syntax tree containing a possible part of speech for the potentially confused word is produced.

19. An apparatus for parsing a segment of natural language input text containing one or more words using grammar rules and a dictionary containing a plurality of entries, each dictionary entry corresponding to a word in the natural language and specifying one or more possible parts of speech for the word, comprising:

a data structure for containing a parse tree representing the input text segment and parsing results intermediate thereto;

a primary part-of-speech record generator that creates a part-of-speech record in the data structure for each word occurring in the input text segment, each part-of-speech record specifying a part-of-speech record specified by the dictionary entry for the word;

an identifier that identifies a word occurring in the input text segment that is commonly confused with another word;

a secondary part-of-speech record generator that creates a part-of-speech record in the chart memory for the word identified by the identifier, the created part-of-speech record specifying a part of speech specified by the dictionary entry for the word commonly confused with the identified word; and a grammar rule application subsystem that applies the grammar rules to both the part-of-speech records created by the primary part-of-speech record generator and those created by the secondary part-of-speech record generator.

20. A computer-readable medium containing instructions for controlling a computer system to load into a parser a list of rules and lexical records for the parser to apply when parsing a segment of natural language input text containing words, each contained word having associated with it lexical information, by:

(a) adding to the list lexical records, each lexical record specifying lexical information associated with one of the words contained in the input text segment;

(b) identifying a word contained in the input text that is commonly confused with another word;

(c) adding to the list a lexical record specifying lexical information associated with the word with which the identified word is commonly confused; and (d) adding to the list rules that can be applied to the lexical records added to the list in steps (a) and (c).

* * * * *